US011199411B2

(12) United States Patent
Patel et al.

(10) Patent No.: US 11,199,411 B2
(45) Date of Patent: Dec. 14, 2021

(54) SYSTEMS AND METHODS FOR UTILIZING GRAPH BASED MAP INFORMATION AS PRIORS FOR LOCALIZATION USING PARTICLE FILTER

(71) Applicant: FUJIFILM Business Innovation Corp., Tokyo (JP)

(72) Inventors: Miteshkumar Patel, San Jose, CA (US); Jacob Biehl, San Jose, CA (US); Andreas Girgensohn, Palo Alto, CA (US)

(73) Assignee: FUJIFILM Business Innovation Corp., Tokyo (JP)

(*) Notice: Subject to any disclaimer, the term of this patent is extended or adjusted under 35 U.S.C. 154(b) by 546 days.

(21) Appl. No.: 15/726,371

(22) Filed: Oct. 5, 2017

(65) Prior Publication Data

US 2018/0328738 A1 Nov. 15, 2018

Related U.S. Application Data

(63) Continuation-in-part of application No. 15/595,931, filed on May 15, 2017, now Pat. No. 10,812,877.

(51) Int. Cl.
*G01C 21/30* (2006.01)
*G01C 21/20* (2006.01)
(Continued)

(52) U.S. Cl.
CPC ......... *G01C 21/206* (2013.01); *G01C 21/165* (2013.01); *G01S 5/02* (2013.01);
(Continued)

(58) Field of Classification Search
CPC ....... G01C 21/206; G01C 21/165; G01S 5/02; H04W 4/33; H04W 4/029
See application file for complete search history.

(56) References Cited

U.S. PATENT DOCUMENTS 9,709,404 B2 7/2017 Roumeliotis et al.
2006/0161814 A1* 7/2006 Wocke ................. G06K 9/6251
714/26
(Continued)

OTHER PUBLICATIONS

Andreas Svensson; "Particle Filter Explained without Equations;" Oct. 8, 2013; YouTube, https://www.youtube.com/watch?v=aUkBa1zMKv4; pp. 1-35 (Year: 2013).*
(Continued)

*Primary Examiner* — Mohamed Charioui
*Assistant Examiner* — Christine Y Liao
(74) *Attorney, Agent, or Firm* — Procopio, Cory, Hargreaves & Savitch, LLP (57) ABSTRACT

A computer-implemented method performed in a computerized system incorporating a central processing unit, a localization signal receiver, a plurality of sensors, separate and distinct from the localization signal receiver, and a memory, the computer-implemented method involving: using the central processing unit to initialize a plurality of particles based on an information on a map graph; using the central processing unit to repeatedly execute a particle filter loop, wherein the particle filter loop includes: using the central processing unit to perform a motion update of the plurality of particles; using the central processing unit to perform a measurement update of the plurality of particles; and using the central processing unit to perform a resampling of the plurality of particles based on particle importance weights and the map graph information. The location of the computerized system is subsequently determined based on the plurality of particles.

19 Claims, 6 Drawing Sheets

(51) Int. Cl.
 H04W 4/029 (2018.01)
 H04W 4/33 (2018.01)
 G01S 5/02 (2010.01)
 G01C 21/16 (2006.01)
 H04W 4/80 (2018.01)
 H04W 4/38 (2018.01)

(52) U.S. Cl.
 CPC ........... *G01S 5/0294* (2013.01); *H04W 4/029* (2018.02); *H04W 4/33* (2018.02); *H04W 4/38* (2018.02); *H04W 4/80* (2018.02)

(56) References Cited

U.S. PATENT DOCUMENTS

| | | | |
|---|---|---|---|
| 2007/0183670 A1* | 8/2007 | Owechko | G06K 9/00369 382/224 |
| 2008/0054158 A1* | 3/2008 | Ariyur | G01S 3/7864 250/203.1 |
| 2013/0095849 A1* | 4/2013 | Pakzad | H04W 64/00 455/456.1 |
| 2014/0214427 A1 | 7/2014 | Chao et al. | |
| 2015/0350849 A1 | 12/2015 | Huang et al. | |
| 2017/0241787 A1 | 8/2017 | Trigoni et al. | |
| 2017/0269189 A1 | 9/2017 | Swindell et al. | |
| 2018/0292216 A1* | 10/2018 | Jimenez Gonzalez | G01S 19/49 |

OTHER PUBLICATIONS

Office Action for related U.S. Appl. No. 15/595,931, dated Mar. 11, 2020, 33 pages.

Y. Gu, A. Lo, and I. Niemegeers, "A survey of indoor positioning systems for wireless personal networks," IEEE Commun. Surv. Tutor., vol. 11, No. 1, pp. 13-32, First 2009.

F. Li, C. Zhao, G. Ding, J. Gong, C. Liu, and F. Zhao, "A Reliable and Accurate Indoor Localization Method Using Phone Inertial Sensors," in Proceedings of the 2012 ACM Conference on Ubiquitous Computing, New York, NY, USA, 2012, pp. 421-430.

J. Biswas and M. Veloso, "WiFi localization and navigation for autonomous indoor mobile robots," in 2010 IEEE International Conference on Robotics and Automation, 2010, pp. 4379-4384.

N. Ravi, P. Shankar, A. Frankel, A. Elgammal, and L. Iftode, "Indoor Localization Using Camera Phones," in Seventh IEEE Workshop on Mobile Computing Systems Applications (WMCSA'06 Supplement), 2006, vol. Supplement, pp. 1-7.

L. Liao, D. Fox, J. Hightower, H. Kautz, and D. Schulz, "Voronoi tracking: location estimation using sparse and noisy sensor data," in Proceedings 2003 IEEE/RSJ International Conference on Intelligent Robots and Systems (IROS 2003) (Cat. No. 03CH37453), 2003, vol. 1, pp. 723-728 vol. 1.

P. Mirowski, T. K. Ho, S. Yi, and M. MacDonald, "SignalSLAM: Simultaneous localization and mapping with mixed WiFi, Bluetooth, LTE and magnetic signals," in International Conference on Indoor Positioning and Indoor Navigation, 2013, pp. 1-10.

"Friis Free Space Propagation Model," GaussianWaves, Sep. 27, 2013.

S. Thrun, "Particle Filters in Robotics," in Proceedings of the Eighteenth Conference on Uncertainty in Artificial Intelligence, San Francisco, CA, USA, 2002, pp. 511-518.

H. Lategahn, M. Schreiber, J. Ziegler, and C. Stiller, "Urban localization with camera and inertial measurement unit," in 2013 IEEE Intelligent Vehicles Symposium (IV), 2013, pp. 719-724.

S. M. Oh, S. Tariq, B. N. Walker, and F. Dellaert, "Map-based priors for localization," in 2004 IEEE/RSJ International Conference on Intelligent Robots and Systems (IROS) (IEEE Cat. No. 04CH37566), 2004, vol. 3, pp. 2179-2184 vol. 3.

C. Yu, N. El-Sheimy, H. Lan, and Z. Liu, "Map-Based Indoor Pedestrian Navigation Using an Auxiliary Particle Filter," Micromachines, vol. 8, No. 7, p. 225, Jul. 2017.

H. Nurminen, M. Koivisto, S. Ali-Löytty, and R. Piché, "Motion model for positioning with graph-based indoor map," in 2014 International Conference on Indoor Positioning and Indoor Navigation (IPIN), 2014, pp. 646-655.

G. R. Jagadeesh, T. Srikanthan, and X. D. Zhang, "A Map Matching Method for GPS Based Real-Time Vehicle Location," J. Navig., vol. 57, pp. 429-440, Sep. 2004.

C. He, S. Guo, and Y. Yang, "Voronoi diagram based indoor localization in wireless sensor networks," in 2015 IEEE International Conference on Communications (ICC), 2015, pp. 3269-3274.

N. Y. Ko and T.-Y. Kuc, "Fusing range measurements from ultrasonic beacons and a laser range finder for localization of a mobile robot," Sensors, vol. 15, No. 5, p. 11050-11075, May 2015.

* cited by examiner

SYSTEMS AND METHODS FOR UTILIZING GRAPH BASED MAP INFORMATION AS PRIORS FOR LOCALIZATION USING PARTICLE FILTER

CROSS-REFERENCE TO RELATED APPLICATIONS

This patent application claims the benefit of priority of and is a continuation-in-part of U.S. patent application Ser. No. 15/595,931 entitled "SYSTEM AND METHOD FOR CALIBRATION-LESSLY COMPENSATING BIAS OF SENSORS FOR LOCALIZATION AND TRACKING" and filed on May 15, 2017 (pending), the entire disclosure of which is incorporated by reference herein.

BACKGROUND OF THE INVENTION

Technical Field

The disclosed embodiments relate in general to localization and tracking systems and methods and, more specifically, to systems and methods for utilizing graph based map information as priors for localization using a particle filter.

Description of the Related Art

The spreading of personal communication systems into many public and private places, as well as the onset of new generation of smartphones, has enabled the development of a vast number of indoor positioning systems based on standard wireless communication technologies as described, for example, in Y. Gu, A. Lo, and I. Niemegeers, "A survey of indoor positioning systems for wireless personal networks," *IEEE Commun. Surv. Tutor.*, vol. 11, no. 1, pp. 13-32, First 2009. Various localization techniques have been developed and experimented using variety of sensors such as magnetometer, described, for example, in I. Vallivaara, J. Haverinen, A. Kemppainen, and J. Röning, "Magnetic field-based SLAM method for solving the localization problem in mobile robot floor-cleaning task," in 2011 15th *International Conference on Advanced Robotics (ICAR)*, 2011, pp. 198-203, inertial measurement unit (IMU) is described, for example, in F. Li, C. Zhao, G. Ding, J. Gong, C. Liu, and F. Zhao, "A Reliable and Accurate Indoor Localization Method Using Phone Inertial Sensors," in *Proceedings of the* 2012 *ACM Conference on Ubiquitous Computing*, New York, N.Y., USA, 2012, pp. 421-430, radio frequency sensors (WiFi or Bluetooth low energy (BLE)) described in "Robotics Institute: Wifi localization and navigation for autonomous indoor mobile robots." [Online]. Available: www.ri.cmu.edu/publication_view.html?pub_id=6819, imaging sensors described in N. Ravi, P. Shankar, A. Frankel, A. Elgammal, and L. Iftode, "Indoor Localization Using Camera Phones," in *Seventh IEEE Workshop on Mobile Computing Systems Applications (WMCSA '06 Supplement)*, 2006, pp. 49-49 as well as a fusion of these sensors as described in P. Mirowski, T. K. Ho, S. Yi, and M. MacDonald, "SignalSLAM: Simultaneous localization and mapping with mixed WiFi, Bluetooth, LTE and magnetic signals," in International Conference on Indoor Positioning and Indoor Navigation, 2013, pp. 1-10.

As would be appreciated by persons of ordinary skill in the art, each of the above sensors has its own limitations in terms of noise, sampling rate, characteristics and/or dimensionality. This introduces new challenges in estimating the location of user or robot using data supplied by the aforesaid sensors. Therefore, in view of the aforesaid limitations of the conventional technology, new and improved systems and methods are needed for indoor localization and tracking applications.

SUMMARY OF THE INVENTION

The embodiments described herein are directed to methods and systems that substantially obviate one or more of the above and other problems associated with conventional localization and tracking systems.

In accordance with one aspect of the inventive concepts described herein, there is provided a computer-implemented method, the method being performed in a computerized system incorporating a central processing unit, a localization signal receiver, a plurality of sensors, separate and distinct from the localization signal receiver, and a memory, the computer-implemented method involving: using the central processing unit to initialize a plurality of particles based on an information on a map graph; using the central processing unit to repeatedly execute a particle filter loop, wherein the particle filter loop includes: using the central processing unit to perform a motion update of the plurality of particles; using the central processing unit to perform a measurement update of the plurality of particles; and using the central processing unit to perform a resampling of the plurality of particles based on particle importance weights and the map graph information. The location of the computerized system is subsequently determined based on the plurality of particles.

In one or more embodiments, the localization signal receiver is a Bluetooth receiver and wherein the localization signal sources are Bluetooth low energy (BLE) beacons.

In one or more embodiments, the localization signal receiver is a radiofrequency receiver and wherein the localization signal sources are radiofrequency sources.

In one or more embodiments, the plurality of sensor readings includes magnetometer data.

In one or more embodiments, the plurality of sensor readings includes acceleration data.

In one or more embodiments, the plurality of sensor readings includes a three-dimensional spatial orientation data.

In one or more embodiments, the method further involves calculating an orientation of the computerized system using an attitude and heading reference system (AHRS) algorithm performed on at least some of the plurality of sensor readings.

In one or more embodiments, the plurality of sensors are incorporated into an inertial measurement unit (IMU).

In one or more embodiments, performing the measurement update involves calculating a distance between each of a plurality of particles and at least one localization signal source based on the received localization signal.

In one or more embodiments, performing the measurement update involves updating a plurality of particles using a confidence of a classifier.

In one or more embodiments, resampling the plurality of particles involves calculating a weight for each of a plurality of particles and replicating particles of the plurality of particles with higher weights.

In one or more embodiments, performing the resampling of the plurality of particles involves generating new particles in the plurality of particles based on particle importance weights and conditioning the newly generated particles on the map graph information.

In one or more embodiments, conditioning the newly generated particles on the map graph information involves projecting each of the newly generated particles on a corresponding closest edge of the map graph.

In one or more embodiments, the map graph includes a plurality of nodes interconnected by a plurality of edges.

In one or more embodiments, the nodes of the map graph are evenly spaced.

In one or more embodiments, the nodes of the map graph are arranged in a square grid.

In one or more embodiments, the nodes of the map graph are arranged in a triangular grid.

In one or more embodiments, the nodes of the map graph are evenly spaced inside a room of a building.

In one or more embodiments, the map graph includes a first plurality of nodes corresponding to an inside of at least two rooms of a building and a second plurality of nodes representing a navigation between the at least two rooms.

In one or more embodiments, the nodes of the map graph are automatically generated based on a location of a single initial node of the map graph within a room and coordinates of corners of the room.

In accordance with another aspect of the inventive concepts described herein, there is provided a non-transitory computer-readable medium embodying a set of computer-executable instructions, which, when executed in connection with a computerized system incorporating a central processing unit, a Bluetooth localization signal receiver, a plurality of sensors, separate and distinct from the Bluetooth localization signal receiver, and a memory, cause the computerized system to perform a method involving: using the central processing unit to initialize a plurality of particles based on an information on a map graph; using the central processing unit to repeatedly execute a particle filter loop, wherein the particle filter loop includes: using the central processing unit to perform a motion update of the plurality of particles; using the central processing unit to perform a measurement update of the plurality of particles; and using the central processing unit to perform a resampling of the plurality of particles based on particle importance weights and the map graph information. The location of the computerized system is subsequently determined based on the plurality of particles.

In accordance with yet another aspect of the inventive concepts described herein, there is provided a computerized system incorporating a central processing unit, a Bluetooth localization signal receiver, a plurality of sensors, separate and distinct from the Bluetooth localization signal receiver, and a memory, the memory storing a set of computer-readable instructions causing the system to perform a method involving: using the central processing unit to initialize a plurality of particles based on an information on a map graph; using the central processing unit to repeatedly execute a particle filter loop, wherein the particle filter loop includes: using the central processing unit to perform a motion update of the plurality of particles; using the central processing unit to perform a measurement update of the plurality of particles; and using the central processing unit to perform a resampling of the plurality of particles based on particle importance weights and the map graph information. The location of the computerized system is subsequently determined based on the plurality of particles.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The described embodiments are generally related to systems and methods capable of accurate localization from noisy sensor measurement. As would be appreciated by persons of ordinary skill in the art, such accurate localization is a fundamental requirement for various applications, such as applications that require localization and tracking of a robot or a user in a given environment. As would be also appreciated by persons of ordinary skill in the art, many of the hardware sensors that are used for localization and tracking are very noisy, which results in a challenging signal processing problem.

On the other hand, particle filter (PF) based localization algorithms, well known to persons of ordinary skill in the art, have proven successful at effectively fusing various sensors outputs to create meaningful location predictions. The aforesaid particle filter algorithm is a Monte Carlo methodology to solve filtering problems for estimating the internal states in dynamical systems using incomplete and/or noisy sensor measurements. As it is well known in the art, the modularity of the aforesaid particle filter algorithms makes them ideal for generating real time localization data using readings of multiple noisy sensors.

In one or more embodiments, there is provided a localization method wherein map information, represented as a connected graph, is incorporated within the particle filter based framework to initialize and update the states of the particles, which are conditioned on the graph information. In one or more embodiments, the aforesaid graph comprises nodes and edges. The localization system fuses the graph information with sensor information within a particle filter framework. In one or more embodiments, the aforesaid graph encapsulates the entire environment with nodes and edges, which represents valid space where user or robot can navigate through. In various embodiments, the graph-based map is utilized in two different steps of the particle filter based localization method. The first time, the graph-based map is used during the initialization of particles and the second time it is used during the resampling of particles.

In one embodiment, the resampling of particles by the particle filter is conditioned on the importance weights as well as the closest edge in the map graph, wherein the new particles are projected on to that edge. As would be appreciated by persons of ordinary skill in the art, conditioning the particles on both of these parameters allows the generation of new particles closest to the samples with highest confidence and further projecting them to closest edge in the graph. The described embodiment assists the particle filter based localization algorithm in improving its location estimate accuracy as it inherently utilizes areas where the user or robot can navigate.

In accordance with one embodiment, the described system and method fuses the graph based map information with readings from multiple sensors, which sense both the motion and environment to get better location estimate. The described methodology exploits the modularity of the aforesaid particle filter algorithm to fuse together multiple types of information. In one or more embodiments, the aforesaid graph based map information is utilized during the resampling phase of the particle filter operation and the resampling of particles is done using two parameters, the importance weights resampling and projecting the new particles to the closest edge of the graph. The proposed fusion of graph-based map in the resampling phase provides a way to generate new particles, which are conditioned on both the importance weight samples and the closest edge to the importance weight sample. Further, we also provide methods using which a graph map can be extrapolated from a single node and edge to multiple nodes and edges so that the map graph can be extended in places where there are insufficient nodes and edges to cover the entire space. Specifically, in one or more embodiments, the aforesaid graph map may be automatically extrapolated starting with a single node information and the coordinates of the corners of the specific room.

Utilization of graph based map information intuitively provides the particle filter information of walls and other obstacles, which a user or robot cannot walk through. Further, initialization of particles around the graph also allows the particle filter to converge faster as compared to random distribution of particles. Lastly, incorporating the graph in the resampling phase of the particle filter allows the particles with highest weight to maintain its states and only project the new particles on the graph. This provides a more natural way of influencing the highest weight particles to move towards the graph as new particles are generated on the edges of the graph.

Figure 1:
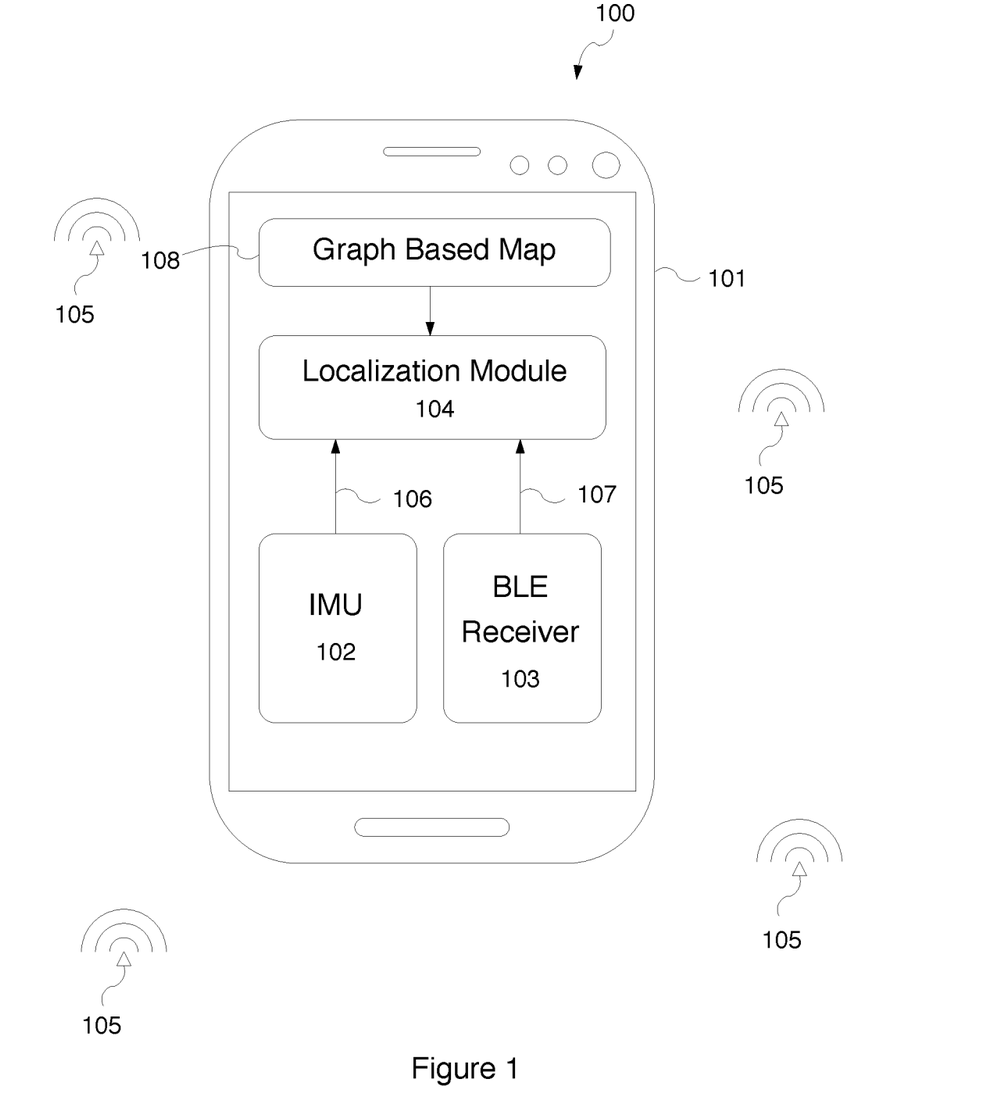
FIG. 1 illustrates an exemplary embodiment of a system based on which the described techniques could be implemented.

FIG. 1 illustrates an exemplary embodiment of a system 100 based on which the described techniques could be implemented. In one embodiment, the system 100 is implemented based on a mobile device 101 such as a smartphone. The system 100 uses data 106 generated by inertial measurement unit (IMU) sensors 102 and data 107 generated by the BLE receiver 103, both of which are furnished to a localization module 104 executed by the processor of the mobile device 101. The signal 107 of the BLE receiver 103 corresponds to multiple BLE beacons 105 disposed in the surroundings, such as in different rooms of a building. In addition, the localization module 104 uses a graph based map 108 to assist in determining the location information as will be described in detail below.

The BLE scans consist of radio frequency (RF) signals emitted by different BLE beacons 105 present in the environment. As would be appreciated by persons of ordinary skill in the art, the aforesaid BLE beacon signals are affected heavily by various environmental factors, which makes the localization problem challenging. Further, as it is known in the art, the IMU sensor 102 is a collection of 9-axis sensors, which provides 3-axis linear acceleration and angular velocity form accelerometer and gyroscope, respectively, as well as 3-axis magnetic field. As would be appreciated by persons of ordinary skill in the art, each of these sensors is noisy and hence cannot be used directly to measure the orientation of the device 101 from raw sensor readings. In addition, the measurement bias of these sensors are time-varying and impacted by various factors, including mechanical stress on the sensor, ambient temperature and the misalignment of the sensor at the time of the installation.

Figure 2:
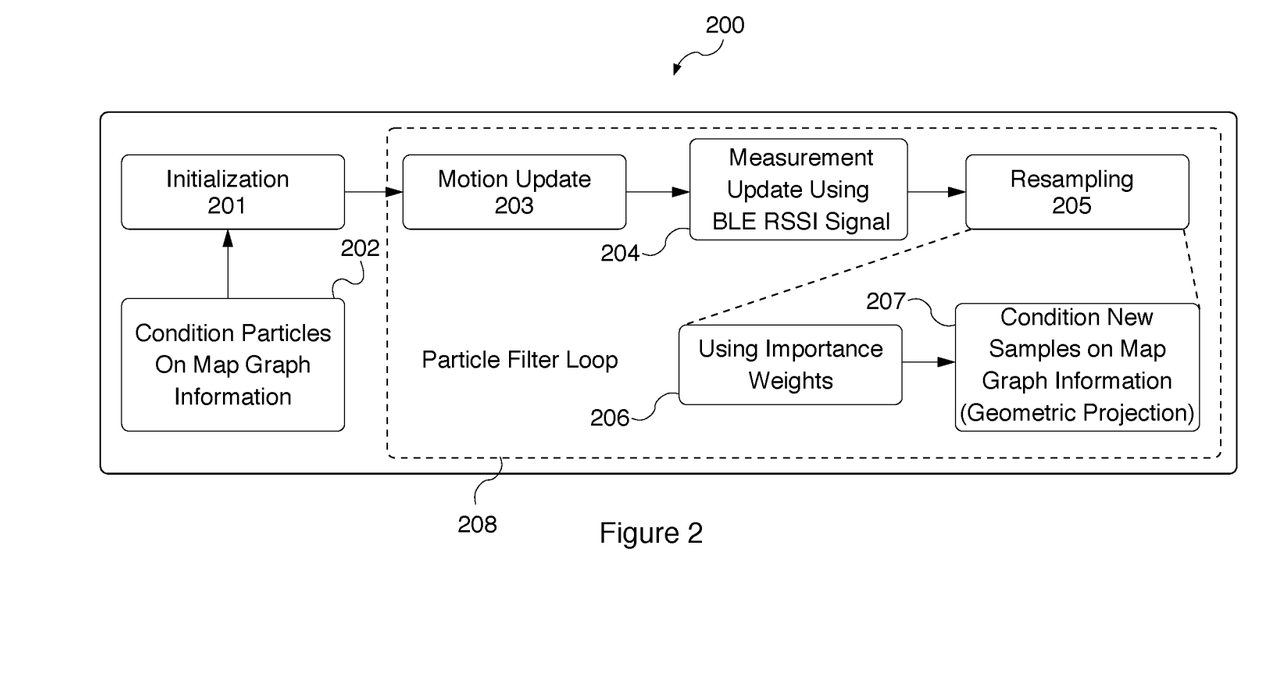
FIG. 2 illustrates an exemplary block diagram of an operating sequence of an embodiment of a system for utilizing graph based map information as priors for localization using a particle filter.

FIG. 2 illustrates an exemplary block diagram 200 of an operating sequence of an embodiment of a system for utilizing graph based map information as priors for localization using a particle filter. In addition, FIG. 2 shows a detailed flow of sensor information between each of the blocks in the block diagram 200. As illustrated in this figure, the initialization of particles in step 201 is conditioned on the map information 202 available in form of graph. On the other hand, the resampling of the particles 205 is conditioned both on the importance of weights 206 and distance between edges of graph and resampled particles, see step 207. The operating sequence shown in FIG. 2 will now be described in detail.

First, at block 201, an initialization step is performed. In one or more embodiments, this step 201 involves initializing the particles, wherein the aforesaid initializing is conditioned on the map graph information 202. In one or more embodiments, the aforesaid utilization of the map graph (shown in FIGS. 4(a) and 4(b)) allows the initialization of the particles to be constrained to the areas in which a user or robot is able to travel.

At block 203 of the operating sequence shown in FIG. 2, a motion update step is performed. This step allows for the update of the particles based on a distance travelled by the user or the robot. In various embodiments, the aforesaid motion update step involves a probabilistic motion update, wherein the localization system determines the orientation of the handheld device 101 using an attitude and heading reference system (AHRS) algorithm, well known in the art, and described in detail in S. O. Madgwick, "An efficient orientation filter for inertial and inertial/magnetic sensor arrays," Rep. X-Io Univ. Bristol UK, 2010, calculated from the IMU data, and sample data from the IMU to generate particles along the moving direction. In one or more embodiments, the orientation of the mobile device 101 is calculated by fusing both the IMU and the magnetometer sensor data.

At block 204 of the operating sequence shown in FIG. 2, a measurement update is performed. This block updates the likelihood of the particles using the signal strength received from the BLE beacons in the environment. In one or more embodiments, the RSSI signals received from each BLE beacon are converted to distance using the Friis Free Space Model, well known in the art, and described in detail in "Friis Free Space Propagation Model," GaussianWaves, 27 Sep. 2013. It should be noted that, in various alternative embodiments, the aforesaid BLE sensor may be replaced with any other type of sensor, which can sense the environment, including, without limitation, a laser range finder, an image sensor or an ultrasound distance sensor.

At block 205 of the operating sequence shown in FIG. 2, an importance resampling is performed. This block uses the importance weight resampling technique to resample particles, see step 206. In various embodiments, in addition to importance weight re-sampling 206, the system may also utilize a geometric projection technique to condition the resampled particles to the closest edge of the map graph, see step 207. In the block diagram 200 shown in FIG. 2, the aforesaid steps 203-207 are repeatedly executed within a particle filter loop 208.

Figure 3:
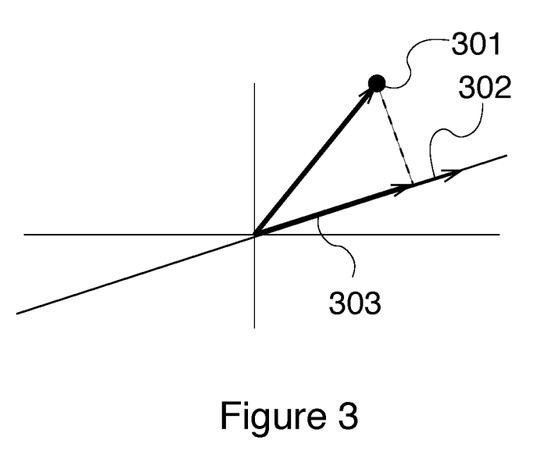
FIG. 3 illustrates the new particles generated from importance weight resampling being projected on the graph edge closest to the respective particles.

As illustrated in FIG. 3, at block 207 of block diagram 200 shown in FIG. 2, the new particles 301 generated from importance weight resampling are projected on the graph edge 302 closest to the respective particles. The resulting projection is designated in FIG. 3 with a numeral 303. This allows generation of new particles around the edges of the map graph and at the same time maintaining the property of importance weights resampling. In one or more embodiments, the geometric projection is applied only to the new generated particles thereby maintaining the states of the important particles around which the new particles are generated.

Figure 4A:
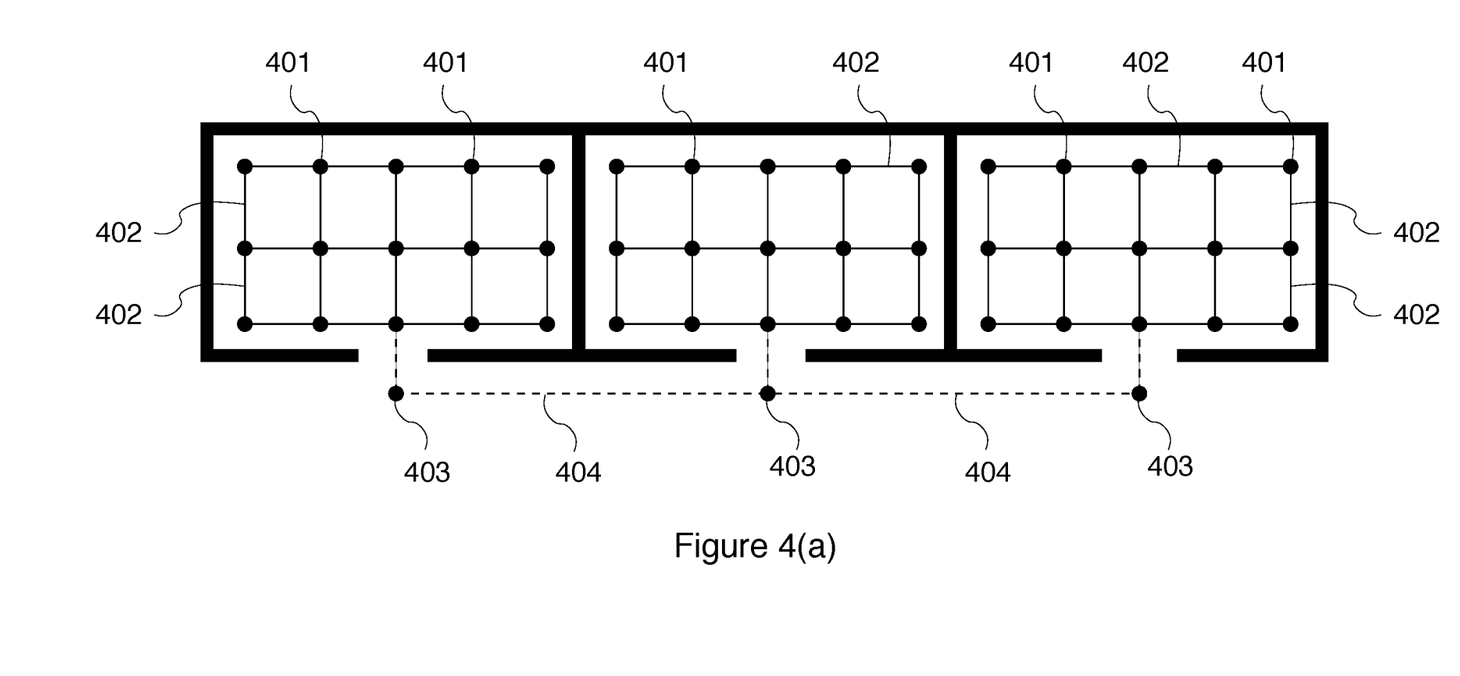
FIG. 4(a) illustrates square grids of navigation nodes inside three rooms.

In one or more embodiments, the described localization system uses a grid of interconnected navigation nodes disposed inside each room of a building. The grid is aligned to the navigation node entering the room. FIG. 4(a) illustrates an exemplary square grid of navigation nodes 401 inside three rooms connected by graph edges 402. Specifically, this figure shows square grids with one meter spacing between nodes 401. Nodes 403 in FIG. 4(a), interconnected with edges 404, indicate the navigation graph between rooms. In one embodiment, the latter nodes 403 and edges 404 of the graph shown in FIG. 4(a) are constructed manually.

Figure 4B:
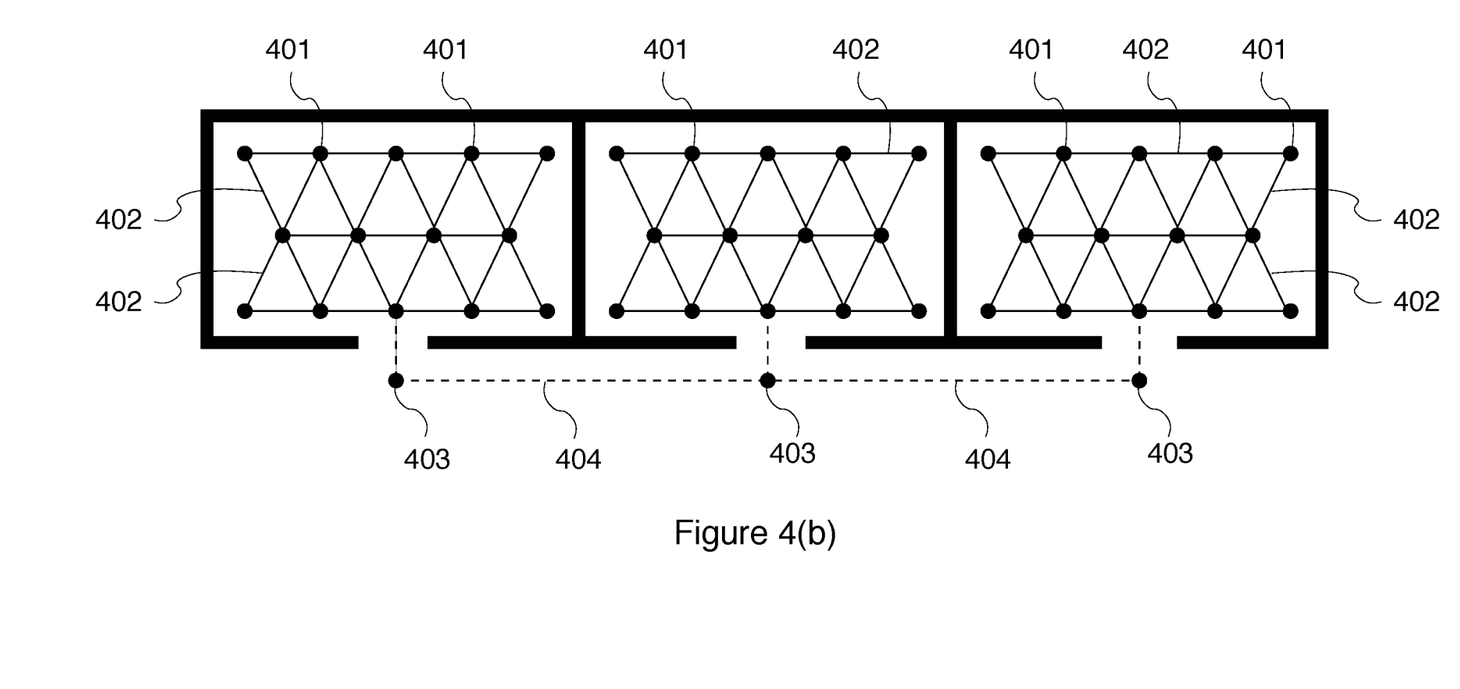
FIG. 4(b) illustrates exemplary triangular grids of navigation nodes inside three rooms.

FIG. 4(b) illustrates an exemplary triangular grid of navigation nodes 401 inside the same three rooms. The triangular grid shown in FIG. 4(b) makes the navigation between nodes 401 more natural. A similar effect could be achieved by adding diagonals to the grid in FIG. 4(a), but that would introduce edges of different lengths and require the addition of nodes in the center of squares where two edges would cross. In various embodiments, other different geometric shapes and spacing may be chosen to fill the inside of the rooms. One example of such other shapes is a hexagonally shaped graph. Therefore, the concepts described herein are not limited to any specific graph structure. On the other hand, it should be noted that leaving rooms empty would produce inferior results, because it would introduce a strong bias towards the door in the room.

In one or more embodiments, the aforesaid map graph consisting of navigation nodes arranged in a square, triangular, hexagonal or any other appropriate patters may be generated automatically using a graph generation algorithms, which uses the coordinate information of the single node in the room and the coordinate information of the four corners of the room. In one embodiment, the additional nodes in the room are automatically generated by way of extrapolation to cover the entire room with the map graph starting from the single (initial). This may be performed algorithmically and hence does not require any manual human involvement.

As would be appreciated by persons of ordinary skill in the art, utilizing the aforesaid graph map information constrains the initialization of particles to the nodes and edges of the graph. In addition, using the geometric projection of the newly resampled particles on to the closest edge in the graph further allows the future state estimates of the particles towards the edges of the graph, hence maintaining the probabilistic posterior update of the particles. Further, being an additional information source to the noisy BLE and IMU data, utilizing the map graph information as a prior, provides better estimation of the particle filter based localization.

Computing Platforms

Figure 5:
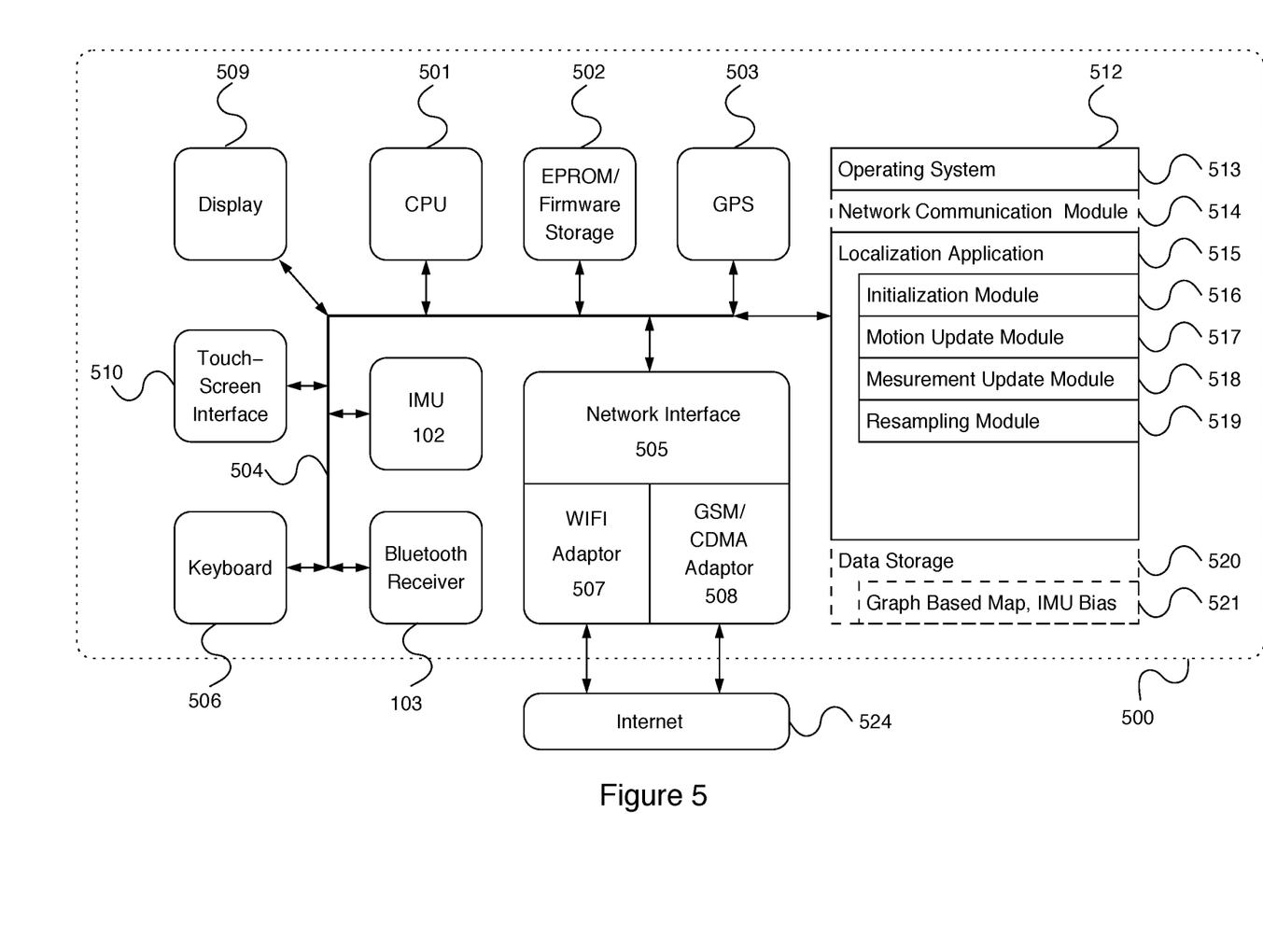
FIG. 5 illustrates an exemplary embodiment of a computerized mobile system that could be used as the handheld client device in connection with the system illustrated in FIG. 1.

FIG. 5 illustrates an exemplary embodiment of a computerized mobile system 500 that could be used as the handheld client device 101 in connection with the system illustrated in FIG. 1. In one or more embodiments, the computerized mobile system 500 may be implemented within a form factor of a mobile computing device, such as a smartphone, a personal digital assistant (PDA), a tablet computer, or a smart watch, all of which are widely available commercially and are well known to persons of skill in the art.

The computerized system 500 may include a data bus 504 or other interconnect or communication mechanism for communicating information across and among various hardware components of the mobile computerized system 500, and a central processing unit (CPU or simply processor) 501 coupled with the data bus 504 for processing information and performing other computational and control tasks. Computerized system 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, computerized system 500 may further include a read only memory (ROM or EPROM) 502 or other static storage device coupled to the data bus 504 for storing static information and instructions for the processor 501, such as firmware necessary for the operation of the computerized system 500, basic input-output system (BIOS), as well as various configuration parameters of the computerized system 500.

In one or more embodiments, the computerized system 500 may incorporate a display device 509, which may be also coupled to the data bus 504, for displaying various information to a user of the computerized system 500. In an alternative embodiment, the display device 509 may be associated with a graphics controller and/or graphics processor (not shown). The display device 509 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 509 may be incorporated into the same general enclosure with the remaining components of the computerized system 500. In an alternative embodiment, the display device 509 may be positioned outside of such enclosure.

In one or more embodiments, the computerized system 500 may further incorporate a GPS receiver 503 connected to the data bus 504 and configured to receive location information from one or more GPS satellites and transmit this information to the processor 501 via the data bus 504.

In one or more embodiments, the computerized system 500 may incorporate one or more input devices, such as a touchscreen interface 510 for receiving tactile commands and a keyboard 506, which all may be coupled to the aforesaid data bus 504 for communicating information, including, without limitation, user command selections to the processor 501. In an alternative embodiment, input devices may include a system for tracking eye movements of the user (not shown), which may be used to indicate to the computerized system 500 the command selection by the user.

In one or more embodiments, the computerized system 500 may additionally include a location signal receiver 103, such as a Bluetooth receiver, configured to perform scan for beacons 106 and supply scan data described above to the processor 501 via the data bus 504. In addition, the IMU 102 may be also connected to the data bus 504.

In one or more embodiments, the computerized system 500 may additionally include a communication interface, such as a network interface 505 coupled to the data bus 504. The network interface 505 may be configured to establish a connection between the computerized system 500 and the Internet 524 using at least one of WIFI interface 507 and the cellular network (GSM or CDMA) adaptor 508. The network interface 505 may be configured to provide a two-way data communication between the computerized system 500 and the Internet 524. The WIFI interface 507 may operate in compliance with 802.11a, 802.11b, 802.11g and/or 802.11n protocols as well as Bluetooth protocol well known to persons of ordinary skill in the art. In an exemplary implementation, the WIFI interface 507 and the cellular network (GSM or CDMA) adaptor 508 send and receive electrical or electromagnetic signals that carry digital data streams representing various types of information. For example, the aforesaid networking components may be used to establish a network data connection between the computerized system 500 and other network components.

In one or more embodiments, the Internet 524 typically provides data communication through one or more sub-networks to other network resources. Thus, the computerized system 500 is capable of accessing a variety of network resources located anywhere on the Internet 524, such as web servers, other content servers as well as other network data storage resources. In one or more embodiments, the computerized system 500 is configured send and receive messages, media and other data, including application program code, through a variety of network(s) including Internet 524 by means of the network interface 505. In the Internet example, when the computerized system 500 acts as a network client, it may request code or data for an application program executing on the computerized system 500. Similarly, it may send various data or computer code to other network resources.

In one or more embodiments, the functionality described herein is implemented by computerized system 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 501 for execution. For example, the instructions may initially be carried on a magnetic disk from a remote computer. Alternatively, a remote computer can load the instructions into its dynamic memory and send the instructions over the Internet 524. Specifically, the computer instructions may be downloaded into the memory 512 of the computerized system 500 from the foresaid remote computer via the Internet 524 using a variety of network data communication protocols well known in the art.

In one or more embodiments, the memory 512 of the computerized system 500 may store any of the following software programs, applications or modules:

1. Operating system (OS) 513, which may be a mobile operating system for implementing basic system services and managing various hardware components of the computerized system 500. Exemplary embodiments of the operating system 513 are well known to persons of skill in the art, and may include any now known or later developed mobile operating systems.

2. Network communication module 514 for enabling network communications using one or more network interfaces described below.

3. A localization application 515 may incorporate a set of software modules 516-519, executed by the processor 501 of the computerized system 500, which cause the computerized mobile system 500 to perform certain predetermined functions. In one or more embodiments, the localization application modules 515 may include, for example, a particle initialization module 516, which initializes particles using the aforesaid map graph information. In addition, the localization application modules 515 may incorporate a motion update module 517 and a measurement update module 518, which perform functions 203 and 204, respectively, shown in FIG. 2. Finally, a resampling module 519 may also be deployed, which performs resampling of particles using the aforesaid importance weights as well as the aforesaid map graph information.

4. Data storage 520 may be used, for example, for storing the graph based map information as well as IMU bias data 521.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in systems and methods for utilizing graph based map information as priors for localization using particle filter. It is intended that the specification and examples be considered as exemplary only, with a true scope and spirit of the invention being indicated by the following claims.

What is claimed is:

1. A computer-implemented method, the method being performed in a computerized system comprising a central processing unit, a localization signal receiver, a plurality of sensors, separate and distinct from the localization signal receiver, and a memory, the memory storing a map graph comprising a plurality of nodes interconnected by a plurality of edges, the computer-implemented method comprising:
   using the central processing unit to, prior to any execution of a particle filter loop, initialize a plurality of particles, each particle of the plurality of particles is constrained onto the plurality of edges and the plurality of nodes of the map graph;
   using the central processing unit to repeatedly execute a particle filter loop, wherein the particle filter loop comprises:
   i. using the central processing unit to perform a motion update of the plurality of particles;
   ii. using the central processing unit to perform a measurement update of the plurality of particles; and
   iii. using the central processing unit to perform a resampling of the plurality of particles based on particle importance weights and the map graph, resampling based on the map graph comprises maintaining states of particles having the highest weight and projecting only each of the newly generated particles on to a corresponding edge of the map graph that is closest to each of the newly generated particles, wherein at least one of the particles having the highest weight is not on any of the plurality of edges and plurality of nodes of the map graph;
   iv. using the central processing unit to repeatedly perform steps i. through iv;
   using the central processing unit to determine a location of the computerized system based on the plurality of particles;
   receiving at least one localization signal using the localization signal receiver;
   obtaining a plurality of sensor readings using the plurality of sensors, wherein the motion update is performed based at least in part on the received localization signal and the received plurality of sensor readings;
   without regard to outputs from the particle filter loop, iteratively and dynamically determining time-varying bias parameters associated with the plurality of the sensors and generating an optimized localization signal beacon map; and
   iteratively feeding the determined time-varying bias parameters into the motion update and providing the optimized localization signal beacon map to the particle filter loop, wherein the location of the computerized system is determined based, at least in part, on the iteratively determined time-varying bias parameters from the motion update without requiring a prior calibration of the plurality of sensors.

2. The computer-implemented method of claim 1, wherein the localization signal receiver is a Bluetooth receiver and wherein the localization signal sources are Bluetooth low energy (BLE) beacons.

3. The computer-implemented method of claim 1, wherein the localization signal receiver is a radiofrequency receiver and wherein the localization signal sources are radiofrequency sources.

4. The computer-implemented method of claim 1, wherein using the central processing unit to perform a measurement update of the plurality of particles comprises using a plurality of sensor readings from the plurality of sensors, wherein the plurality of sensor readings comprises magnetometer data.

5. The computer-implemented method of claim 1, wherein using the central processing unit to perform a measurement update of the plurality of particles comprises using a plurality of sensor readings from the plurality of sensors, wherein the plurality of sensor readings comprises acceleration data.

6. The computer-implemented method of claim 1, wherein using the central processing unit to perform a measurement update of the plurality of particles comprises using a plurality of sensor readings from the plurality of sensors, wherein the plurality of sensor readings comprises a three-dimensional spatial orientation data.

7. The computer-implemented method of claim 1, wherein using the central processing unit to perform a measurement update of the plurality of particles comprises using a plurality of sensor readings from the plurality of sensors, wherein the computer implemented method further comprises further comprising calculating an orientation of the computerized system using an attitude and heading reference system (AHRS) algorithm performed on at least some of the plurality of sensor readings.

8. The computer-implemented method of claim 1, wherein the plurality of sensors are incorporated into an inertial measurement unit (IMU).

9. The computer-implemented method of claim 1, wherein performing the measurement update comprises calculating a distance between each of a plurality of particles and at least one localization signal source based on the received localization signal.

10. The computer-implemented method of claim 1, wherein performing the measurement update comprises updating a plurality of particles using a confidence of a classifier.

11. The computer-implemented method of claim 1, wherein resampling the plurality of particles comprises calculating a weight for each of a plurality of particles and replicating particles of the plurality of particles with higher weights.

12. The computer-implemented method of claim 1, wherein the nodes of the map graph are evenly spaced.

13. The computer-implemented method of claim 1, wherein the nodes of the map graph are arranged in a square grid.

14. The computer-implemented method of claim 1, wherein the nodes of the map graph are arranged in a triangular grid.

15. The computer-implemented method of claim 1, wherein the nodes of the map graph are evenly spaced inside a room of a building.

16. The computer-implemented method of claim 1, wherein the map graph comprises a first plurality of nodes corresponding to an inside of at least two rooms of a building and a second plurality of nodes representing a navigation between the at least two rooms.

17. The computer-implemented method of claim 1, wherein the nodes of the map graph are automatically generated based on a location of a single initial node of the map graph within a room and coordinates of corners of the room.

18. A non-transitory computer-readable medium embodying a set of computer-executable instructions, which, when executed in connection with a computerized system comprising a central processing unit, a Bluetooth localization signal receiver, a plurality of sensors, separate and distinct from the Bluetooth localization signal receiver, and a memory, the memory storing a map graph comprising a plurality of nodes interconnected by a plurality of edges, cause the computerized system to perform a method comprising:
    using the central processing unit to, prior to any execution of a particle filter loop, initialize a plurality of particles, each particle of the plurality of particles is constrained onto the plurality of edges and the plurality of nodes of the map graph;
    using the central processing unit to repeatedly execute a particle filter loop, wherein the particle filter loop comprises:
        i. using the central processing unit to perform a motion update of the plurality of particles;
        ii. using the central processing unit to perform a measurement update of the plurality of particles; and
        iii. using the central processing unit to perform a resampling of the plurality of particles based on particle importance weights and the map graph, resampling based on the map graph comprises maintaining states of particles having the highest weight and projecting only each of the newly generated particles on to a corresponding edge of the map graph that is closest to each of the newly generated particles, wherein at least one of the particles having the highest weight is not on any of the plurality of edges and plurality of nodes of the map graph;
        iv. using the central processing unit to repeatedly perform steps i. through iv;
    using the central processing unit to determine a location of the computerized system based on the plurality of particles;
    receiving at least one localization signal using the localization signal receiver;
    obtaining a plurality of sensor readings using the plurality of sensors, wherein the motion update is performed based at least in part on the received localization signal and the received plurality of sensor readings;
    without regard to outputs from the particle filter loop, iteratively and dynamically determining time-varying bias parameters associated with the plurality of the sensors and generating an optimized localization signal beacon map; and
    iteratively feeding the determined time-varying bias parameters into the motion update and providing the optimized localization signal beacon map to the particle filter loop, wherein the location of the computerized system is determined based, at least in part, on the iteratively determined time-varying bias parameters from the motion update without requiring a prior calibration of the plurality of sensors.

19. A computerized system comprising a central processing unit, a Bluetooth localization signal receiver, a plurality of sensors, separate and distinct from the Bluetooth localization signal receiver, and a memory, the memory storing a map graph comprising a plurality of nodes interconnected by a plurality of edges, the memory storing a set of computer-readable instructions causing the computerized system to perform a method comprising:
    using the central processing unit to, prior to any execution of a particle filter loop, initialize a plurality of particles, each particle of the plurality of particles is constrained onto the plurality of edges and the plurality of nodes of the map graph;
    using the central processing unit to repeatedly execute a particle filter loop, wherein the particle filter loop comprises:
        i. using the central processing unit to perform a motion update of the plurality of particles;
        ii. using the central processing unit to perform a measurement update of the plurality of particles; and
        iii. using the central processing unit to perform a resampling of the plurality of particles based on particle importance weights and the map graph, resampling based on the map graph comprises maintaining states of particles having the highest weight and projecting only each of the newly generated particles on to a corresponding edge of the map graph that is closest to each of the newly generated particles, wherein at least one of the particles having the highest weight is not on any of the plurality of edges and plurality of nodes of the map graph;
        iv. using the central processing unit to repeatedly perform steps i. through iv; and
    using the central processing unit to determine a location of the computerized system based on the plurality of particles;
    receiving at least one localization signal using the localization signal receiver;
    obtaining a plurality of sensor readings using the plurality of sensors, wherein the motion update is performed based at least in part on the received localization signal and the received plurality of sensor readings;
    without regard to outputs from the particle filter loop, iteratively and dynamically determining time-varying bias parameters associated with the plurality of the sensors and generating an optimized localization signal beacon map; and iteratively feeding the determined time-varying bias parameters into the motion update and providing the optimized localization signal beacon map to the particle filter loop, wherein the location of the computerized system is determined based, at least in part, on the iteratively determined time-varying bias parameters from the motion update without requiring a prior calibration of the plurality of sensors.

* * * * *